United States Patent
Ali et al.

(10) Patent No.: US 10,685,341 B2
(45) Date of Patent: Jun. 16, 2020

(54) SYSTEMS AND METHODS FOR CLUSTERING OF CUSTOMERS USING TRANSACTION PATTERNS

(71) Applicant: Walmart Apollo, LLC, Bentonville, AR (US)

(72) Inventors: Afroza Ali, Sunnyvale, CA (US); Kannan Achan, Mountain View, CA (US); Ron Benson, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/544,876

(22) Filed: Aug. 19, 2019

(65) Prior Publication Data

US 2019/0370775 A1  Dec. 5, 2019

Related U.S. Application Data

(63) Continuation of application No. 16/154,667, filed on Oct. 8, 2018, now Pat. No. 10,387,864, which is a continuation of application No. 13/905,863, filed on May 30, 2013, now Pat. No. 10,096,013.

(51) Int. Cl.
  *G06Q 40/00*  (2012.01)
  *G06Q 20/22*  (2012.01)
(52) U.S. Cl.
  CPC ........... *G06Q 20/22* (2013.01); *G06Q 20/227* (2013.01); *G06Q 40/00* (2013.01)
(58) Field of Classification Search
  CPC .................................................. G06Q 40/00
  See application file for complete search history.

(56) References Cited

U.S. PATENT DOCUMENTS

2009/0234715 A1* 9/2009 Heiser, II ............... G06Q 40/00
                                                              705/39
2013/0159072 A1* 6/2013 Vadhri ............... G06Q 30/0236
                                                              705/14.1

OTHER PUBLICATIONS

Ann Börestam and Heiko Schmiedel, Interchange fees in card payments, Sep. 2011, European Central Bank, No. 131, 6-50 (Year: 2011).*

* cited by examiner

*Primary Examiner* — I Jung Liu
(74) *Attorney, Agent, or Firm* — Bryan Cave Leighton Paisner LLP

(57) ABSTRACT

A system can include one or more non-transitory computer-readable media storing computing instructions configured to run on one or more processors and perform certain acts. The acts can include receiving, at a back-end device of the system, a query from a user interface of a front-end device requesting two or more user identifications mapped to a same payment option of multiple payment options. The acts also can include distilling a subset of user identifications from among the multiple user identifications. Additionally, the acts can include identifying a first classification comprising a single user of the subset of user identifications. Further, the acts can include identifying a second classification comprising two or more first users of the subset of user identifications that are part of a same household. Other embodiments are disclosed.

20 Claims, 5 Drawing Sheets

SYSTEMS AND METHODS FOR CLUSTERING OF CUSTOMERS USING TRANSACTION PATTERNS

CROSS-REFERENCE TO RELATED APPLICATIONS

This application is a continuation of U.S. patent application Ser. No. 16/154,667, filed Oct. 8, 2018, issuing as U.S. Pat. No. 10,387,864, which is a continuation of U.S. patent application Ser. No. 13/905,863, filed May 30, 2013, issued as U.S. Pat. No. 10,096,013. U.S. patent application Ser. Nos. 16/154,667 and 13/905,863 are incorporated herein by reference in their entirety.

TECHNICAL FIELD

The present disclosure relates to electronic commerce and, in particular, to systems and methods for clustering of e-commerce customers using patterns in e-commerce transactions by customers.

BACKGROUND

Electronic commerce, commonly known as e-commerce, has become a popular way of shopping for many in recent years. Most e-commerce merchants require a user, or e-commerce customer, to create an e-commerce customer account for conducting transactions, e.g., purchase and/or sale of goods, on the e-commerce website maintained by the e-commerce merchant. An e-commerce customer account typically includes credentials such as user name and password for login onto a respective e-commerce website. For security or other reasons, the same e-commerce customer may have different user names and/or passwords for various e-commerce websites. From time to time, an e-commerce customer may forget his/her login credentials for a given e-commerce website and, under the circumstances, the e-commerce customer may establish a new user name and/or password for the e-commerce website the login credentials for which he/she forgot. In other words, the same e-commerce customer ends up with more than one e-commerce customer accounts, or profiles, for the same e-commerce website. From the perspective of the e-commerce merchant, however, this situation is not desirable at least for the purposes of targeting and providing recommendations to e-commerce customers. Moreover, the existence of duplicate profiles for the same e-commerce customer introduces artificial sparseness in the customer-to-item relationship from the e-commerce merchant's perspective.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
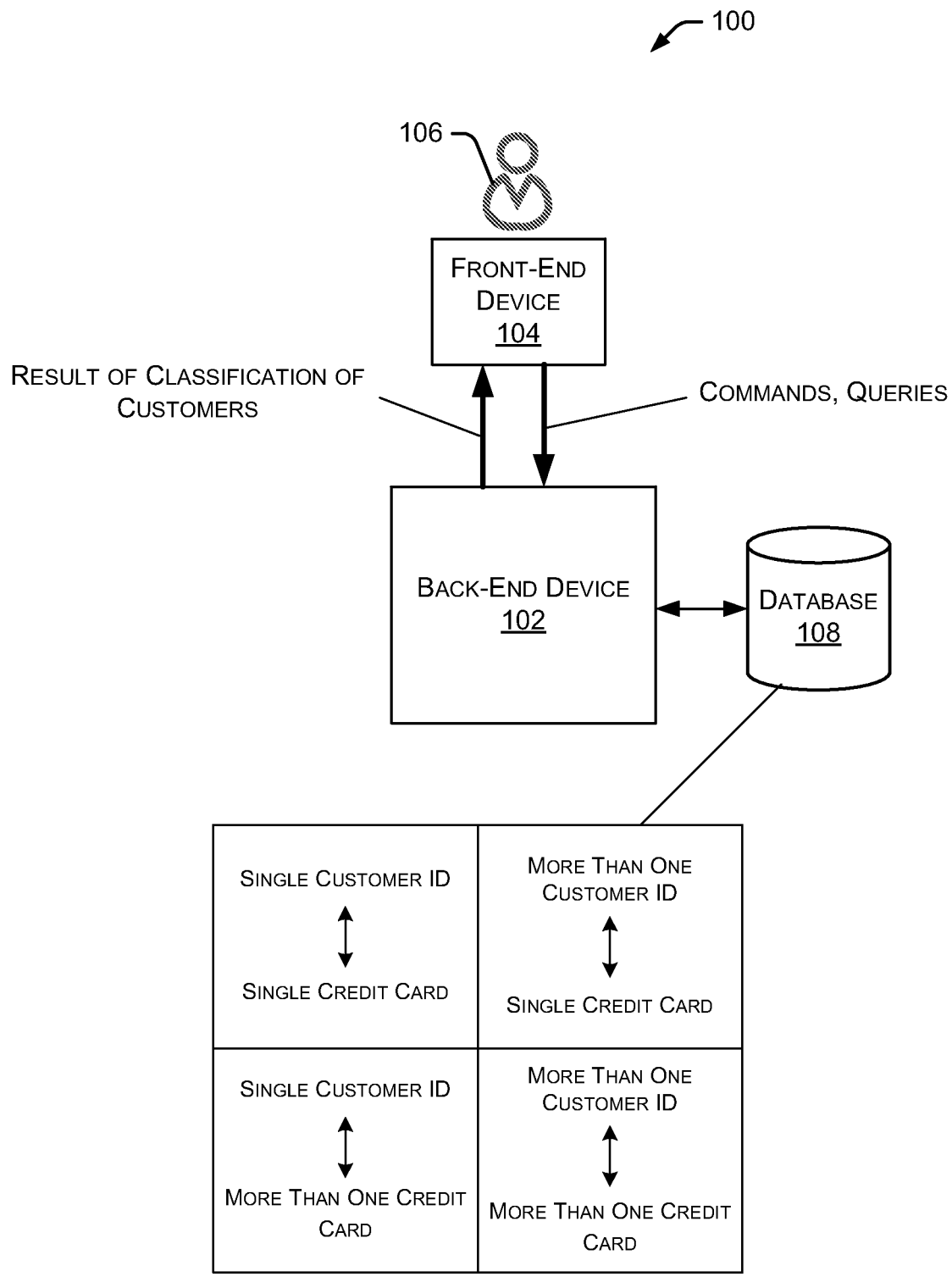
FIG. 1 is a block diagram depicting an example framework of the present disclosure.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the lock diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

An example scenario in which an e-commerce customer forgets his login credentials for a particular e-commerce website and creates a new account for that e-commerce website is described below. The sequence of events are listed in chronological order as follows:

An e-commerce customer John Doe (JD) creates a profile $C_1$ to access an e-commerce website.

JD buys a 3-D flat screen TV using profile $C_1$.

Targeting engine of the e-commerce website selects $C_1$ as a candidate for buying a blu-ray player.

JD forgets the credentials (e.g., user name and/or password) associated with $C_1$ and creates a new profile $C_2$ to access the same e-commerce web site.

JD buys a blu-ray player using profile $C_2$.

Targeting engine of the e-commerce website continues to target $C_1$ for blu-ray player and, additionally, selects $C_2$ as a candidate for buying a 3-D flat screen TV.

As is evident from the above example scenario, it is desirable for the targeting engine, operated by the e-commerce merchant that maintains the e-commerce website, to be aware of the duplicate profiles $C_1$ and $C_2$ that are associated with the same e-commerce customer JD. Furthermore, under such circumstances a recommendation engine, also operated by the e-commerce merchant that maintains the e-commerce website, may be unable to learn certain item-to-item relationship and item-to-user relationship, e.g., the 3-D flat screen TV and the blu-ray player are purchased by the same e-commerce customer. Clearly, such situation is undesirable in terms of monetization from the perspective of the e-commerce merchant as well as in terms of user experience from the perspective of the e-commerce customer.

The proposed systems, methods, algorithms and techniques described herein address the above-described problem by clustering or grouping e-commerce customers into different classifications based on certain patterns in their transactions. In a nutshell, a proposed algorithm of the present disclosure identifies a set of customers who use the same payment option, or traceable tender, under more than one customer identification, and distill the set of customers to find two groups of customer identifications: one group of customer identifications that are mapped to a same individual customer and another group of customer identifications that are mapped to customers who are related to each other, e.g., belonging to the same household. It is assumed that each e-commerce customer has created secure credentials (e.g., user name, password, payment option that includes at least one traceable tender, personal information such as first name, last name, mailing address, etc.) to access and conduct transactions on a given e-commerce website.

Figure 2:
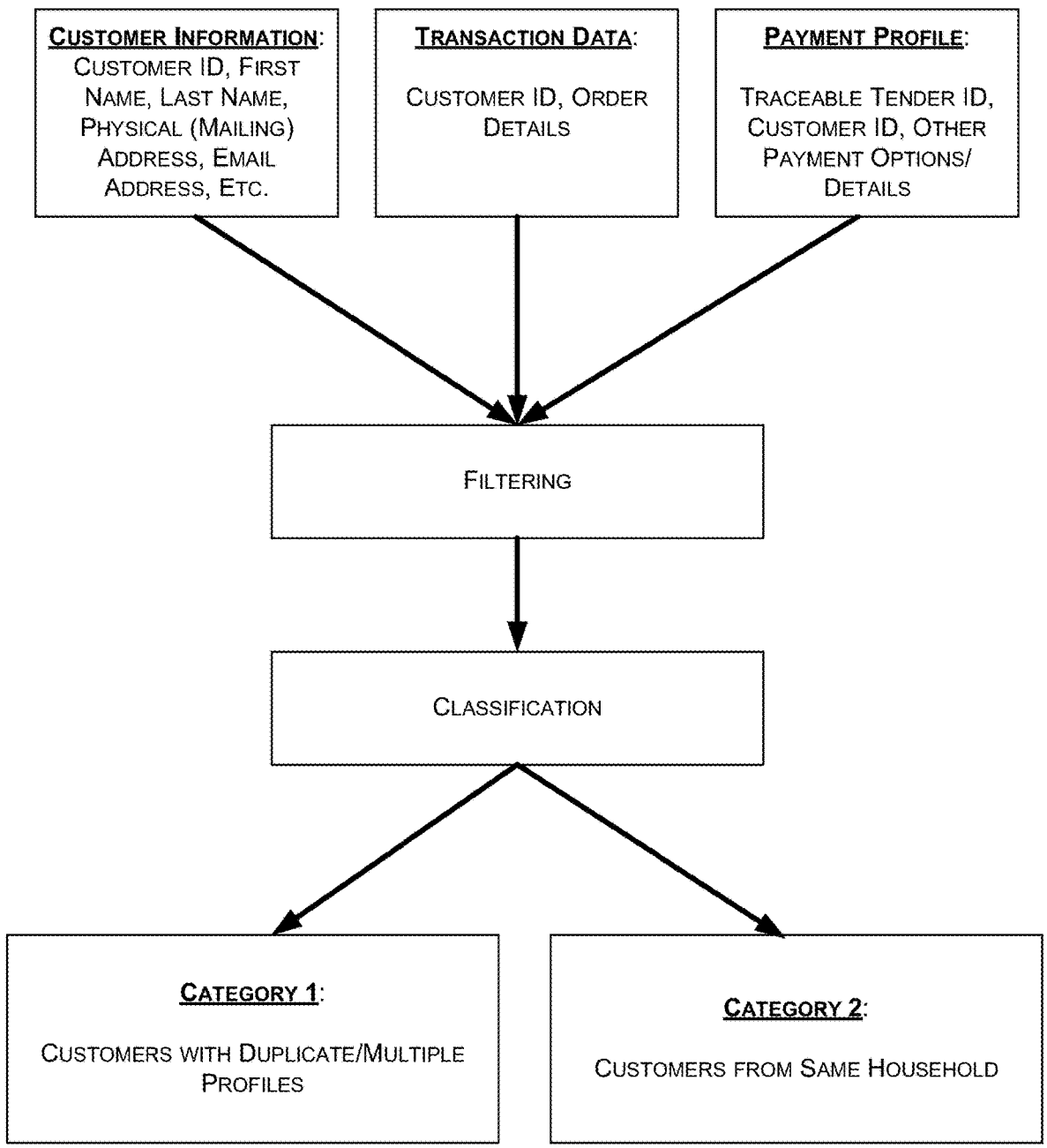
FIG. 2 is a block diagram depicting an example algorithm implemented in systems and methods of the present disclosure.

FIG. 1 illustrates an example framework 100 of the present disclosure. FIG. 2 illustrates an example algorithm 200 implemented in systems and methods of the present disclosure. The description below refers to FIG. 1 and FIG. 2.

Framework 100 includes back-end device 102 and front-end device 104. Back-end device 102 may include one or more processors that execute operations pertaining to algorithms described in the present disclosure. Optionally, database 108 may be communicatively coupled to back-end device 102 to cache or otherwise store some or all of the information and data received, collected and processed by the one or more processors of back-end device 102. In some implementations, database 108 may be an integral part of back-end device 102. Back-end device 102 may be any type of computing device such as, for example, one or more of a desktop computer, a workstation, a server, a mainframe computer, a portable device, etc. Front-end device 104 may be any type of user-interface device including, for example, a combination of one or more of a display panel, a monitor, a keyboard, a computer mouse, a stylus, a keypad, a touch-sensing screen, a voice-command device, or any suitable user-interface device conceivable in the future. Alternatively, front-end device 104 may be any type of computing device such as, for example, a desktop computer, a workstation, a laptop computer, a notebook computer, a tablet, a smartphone, a personal digital assistant, or any suitable handheld device.

Back-end device 102 and front-end device 104 may be integral parts of an apparatus or, alternatively, may be communicatively coupled directly or indirectly through one or more communication devices or one or more networks. In implementations where back-end device 102 and front-end device 104 communicate with one another through one or more networks, the one or more networks may include, for example, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN) or the Internet. In implementations where back-end device 102 and front-end device 104 communicate with one another through one or more networks including at least one wireless network, the at least one wireless network may be, for example, based on one or more wireless standards such as IEEE 802.11 standards, WiFi, Bluetooth, infrared, WiMax, 2G, 2.5G, 3G, 4G, Long Term Evolution (LTE) and/or future versions and/or derivatives thereof.

User 106, an operator of an e-commerce website, operates front-end device 104 to access back-end device 102. For example, through front-end device 104, user 106 sends commands and/or queries to back-end device 102 to view classification of customers of the respective e-commerce website. In response, back-end device 102 provides a result of classification of customers showing the customers of the e-commerce website being clustered or grouped into various groups. For instance, as shown in FIG. 1, the customers are clustered into four groups in terms of customer identifications, namely: a single customer identification associated with a single credit card, more than one customer identification associated with a single credit card, a single customer identification associated with more than on credit card, and more than one customer identification associated with more than one credit card. Those with ordinary skill in the art would appreciate that although the example of FIG. 1 shows credit card as the payment option, or traceable tender, in other examples and actual implementations additional or alternative payment option/traceable tender(s) may be used. Other payment options may include, for example, check, bank account and another form of traceable tender.

Database 108 maintains a database of customer identifications and payment options as associated with a number of customers, well relationships between the customer identifications and the payment options. As shown in FIG. 1, possible relationships between the customer identifications associated with the customers and the payment options associated with the customers include the following: a single customer identification associated with a single credit card, more than one customer identification associated with a single credit card, a single customer identification associated with more than on credit card, and more than one customer identification associated with more than one credit card.

Among the four groups, the group related to more than one customer identification associated with a single credit card is of particular interest. More specifically, the proposed algorithm, as shown in FIG. 2, classifies those customers into two categories: category 1—individual customers with multiple customer identifications, and category 2—multiple customers of the same household. With respect to category 1, a single payment option, e.g., credit card, may be attributed to multiple customer identifications pertaining to the same underlying customer, especially when the customer forgets the credentials to login to the e-commerce website and subsequently creates a new set of credentials. Under this situation, there is no requirement on the customer to use a new payment option and, hence, the same payment option, e.g., credit card, is associated with multiple customer identifications that belong to the same individual customer. This is the case illustrated in the example of John Doe described above. With respect to category 2, a single payment option, e.g., credit card, may be attributed to multiple customer identifications pertaining to customers from the same household. For example, spouses may have different login credentials but share the same credit card and such an analogy applies to parents/children and other members of the household. Exploiting similarities in last names and physical (mailing) address is a way to shed more light on this case.

Referring to FIG. 2, input to the algorithm of the present disclosure includes a list of customers who used the same payment option, e.g., credit card. More specifically, each record in the data set D has a variable length and corresponds to the set of customer identifications that used a particular payment option, along with additional information such as first and last names, physical address, email address and other relevant information. Also, depending on the actual implementation, the algorithm may be adjusted to bias towards customers who have valid traceable tender information on profile and/or customers with some recent activity, etc. The algorithm filters the input information and classifies customers into categories, e.g., category 1 and category 2 as shown in the example depicted in FIG. 2.

Let $D=\{D_i\}$, $i=1, 2, \ldots N$, where $D_i$ denotes a collection of profiles pertaining to customers who used a particular payment option $t_i$ and N denotes a number of records in the data set. Each record $D_k$ may be expressed as $\{t_k, c^1_k, c^2_k, \ldots\}$ where $D_k$ includes $t_k$ a unique identification generated from the payment option, e.g., credit card, and $c^j_k$ represents the jth customer profile that used $t_k$.

In one approach to validate whether the set of customers in a given record $D_k$ belongs to category 1, the algorithm may determine similarities in the customer profiles $\{c^j_k\}$, $j=1, 2, \ldots n_k$, quantify such similarities (or dis-similarities) and filter the similarity (or dissimilarity) using a similarity score which may be an application-dependent threshold. When a given record cannot be grouped into or classified as category 1, the algorithm tries to classify it as a household, or category 2. In this case the algorithm may look for similarity in fewer dimensions of the customer profile data such as, for example, last name and physical address. The operation depends on a threshold that is application-dependent. Spouse and family members with different last names and living in the same address may still be clustered or classified into a household but with a lower probability because of the edit distance penalty incurred for name mismatch. Likewise, in cases where last names are similar but addresses are different, e.g., children in college away from home while parents are at home, the probability of the affected customers belonging to the same household may tend to be lower.

As alluded to above, edit distance is used as a metric that defines similarity between two strings (e.g., between last name, first name, etc.), and edit distance is the number of insertions, deletions and/or substitutions required to transform one string to another. In the algorithm of the present disclosure, edit distance is applied on the first and last names between all pairs of customer profiles in a record (i.e., all customers who shared a given payment option). If a given record $D_k$ has $n_k$ profiles in it, then the set of possible distances between all pairs of last names can be succinctly represented by a matrix $[L_i(i,j)]$, $i=1, 2, \ldots n_k$, where $j=1, 2, n_k$. The same expression may be obtained for first names by $[F_i(i,j)]$.

The algorithm filters for payment options, which may be any form of traceable tender, that are attributed to multiple customer identifications. Additionally, the algorithm may further filter for customer identifications with recent transaction history. In one embodiment, the algorithm filters records by applying a threshold on $[L_t-F_t]$, by ensuring that all values in the matrix are below a predefined threshold. For example, a threshold of 3 may be used to generate the initial results. If all the pairwise edit distances fall below a preset threshold, then all profiles in the line are grouped to one profile and a new customer identification may be generated for the group. The threshold used for this purpose is application-dependent. The lower the threshold the higher the confidence there is, and vice versa.

Let $I_t^{ij}$ be a binary random variable that denotes whether two customers $c_t^i$ and $c_t^j$ in record $D_t$ belong to category 1 ($I_t^{ij}=1$) or otherwise. The posterior probability $P(I_t^{ij}|c_t^i,c_t^j)$ is then calculated. A logistic regression model may be used to represent the posterior distribution for grouping customers as probabilistic inference or matching:

$$P(I_t^{ij} = 1 \mid c_t^i, c_t^j) = \frac{1}{1 + e^{-wx}} \quad (1)$$

In the above equation, equation 1, x is a vector representing features derived from customer profiles in $c^i_t$ and $c^j_t$. $L_t(i,j)$ and $F_t(i,j)$ are used as features for evaluating the posterior. The weights w of the logistic regressor may be readily learned from labeled training data. The set of features used to trigger the logistic regressor may include other form(s) of information such as physical address and email address match, features that depend on transaction patterns (e.g., frequent versus occasional shopping), affinity to brands, category of items purchased, etc. One advantage is that the weights may be estimated automatically from data.

Thus, in summary, the algorithm of the present disclosure receives customer information that includes at least a plurality of customer identifications and a plurality of payment options associated with a plurality of customers. The algorithm identifies a subset of payment options, from among the payment options, and a subset of customer identifications, from among the customer identifications, such that each payment option of the subset of payment options is associated with more than one customer identification of the subset of customer identifications. The algorithm then classifies each customer identification of the subset of customer identifications as either of one of more than one of the customer identifications associated with a single one of the customers or one of more than one of the customer identifications associated with more than one of the customers who are related to each other.

Figure 3:
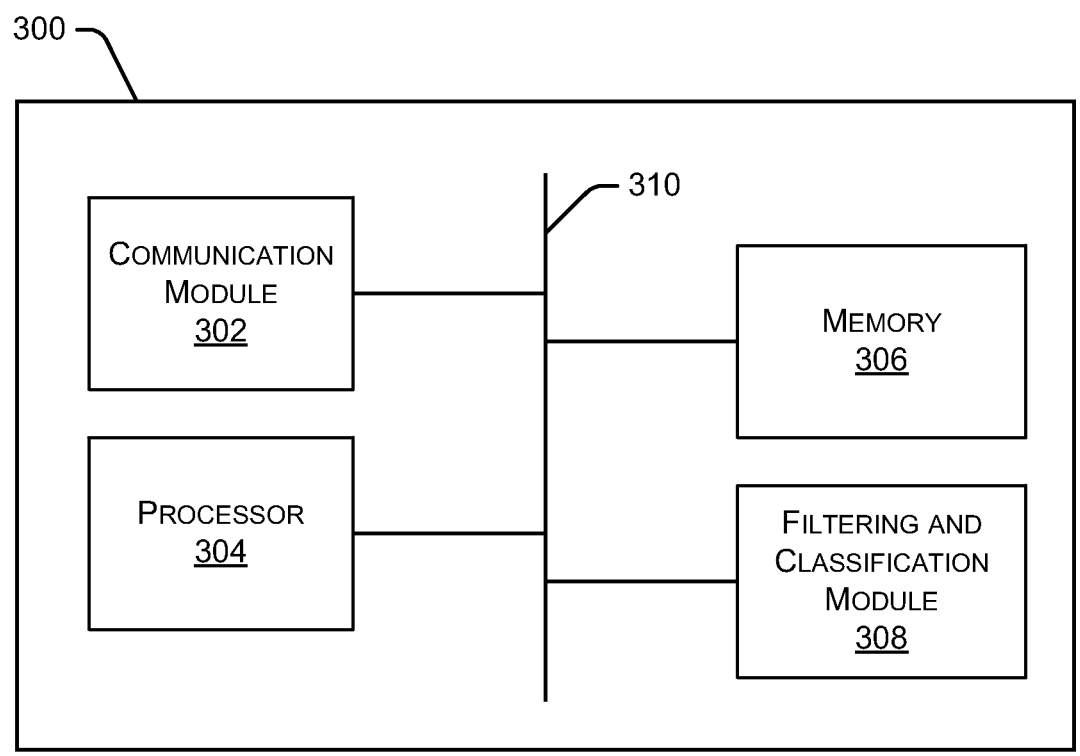
FIG. 3 is a block diagram depicting an embodiment of a computing device configured to implement systems and methods of the present disclosure.

FIG. 3 illustrates an example computing device 300 configured to implement systems and methods of the present disclosure. Computing device 300 performs various functions related to the operation of back-end device 102, as discussed herein. In some embodiments, back-end device 102 includes multiple ones of computing device 300 that cooperatively implement the functions described herein. Computing device 300 includes a communication module 302, a processor 304, and a memory 306. Communication module 302 allows computing device 300 to communicate with other systems, such as communication networks, other servers, front-end device 104, etc. In some embodiments, computing device 300 includes more than one processor 304. For simplicity, however, the description hereinafter refers to the example in which computing device 300 includes one processor 304.

Processor 304 executes one or more sets instructions to implement the functionality provided by computing device 300. Memory 306 stores those one or more sets of instructions executable by processor 304 as well as other data used by processor 304 and other modules contained in computing device 300. Computing device 300 also includes a filtering and classification module 308, which filters and classifies customers as described herein. For illustrative purposes, filtering and classification module 308 is shown in FIG. 3 as an individual module separate from processor 304. In some implementations, however, filtering and classification module 308 may be an integral part of processor 304. A data communication bus 310 allows the various systems and components of computing device 300 to communicate with each other.

Memory 306 may store data and one or more sets of instructions, and processor 304 may execute the one or more sets of instructions and control communication module 302 and filtering and classification module 308. For example, processor 304 may control filtering and classification module 308 to receive, e.g., from database 108, customer information that includes at least a number of customer identifications and a number of payment options associated with a number of customers. Processor 304 may also control filtering and classification module 308 to identify a subset of payment options, from among the payment options, and a subset of customer identifications, from among the customer identifications, such that each payment option of the subset of payment options is associated with more than one customer identification of the subset of customer identifications. Processor 304 may further control filtering and classification module 308 to classifying each customer identification of the subset of customer identifications as either of one of more than one of the customer identifications associated with a single one of the customers or one of more than one of the customer identifications associated with more than one of the customers who are related to each other.

As another example, processor 304 may control filtering and classification module 308 to receive, e.g., from database 108, customer information that includes at least a number of customer identifications and a number of payment options associated with a number of customers. Processor 304 may also control filtering and classification module 308 to identify a subset of payment options, from among the payment options, such that each payment option of the subset of payment options is associated with more than one of the customer identifications. Processor 304 may further control filtering and classification module 308 to classifying each payment option of the subset of payment options as being associated with either a single one of the customers or more than one of the customers who are related to each other.

As yet another example, processor 304 may identify a subset of payment options from among a number of payment options associated with a number of customers. Processor 304 may also identify a subset of customer identifications from among a number of customer identifications associated with the number of customers such that each payment option of the subset of payment options is associated with more than one customer identification of the subset of customer identifications. Processor 304 may further classify each customer identification of the subset of customer identifications as either of one of more than one of the customer identifications associated with a single one of the customers or one of more than one of the customer identifications associated with more than one of the customers who are related to each other.

Figure 4:
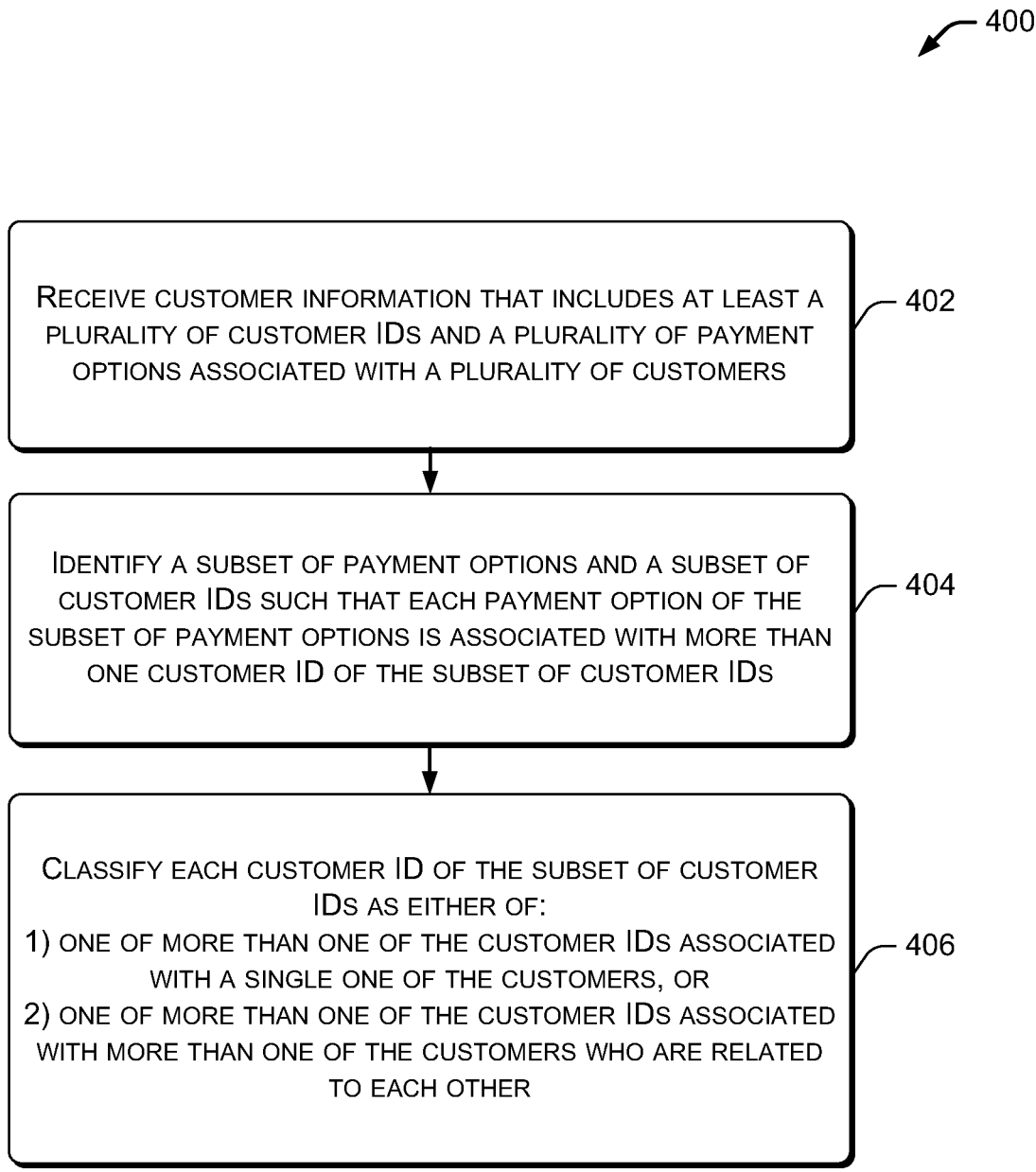
FIG. 4 is a flowchart diagram of an embodiment of a process of the present disclosure.

FIG. 4 illustrates an example process 400 for clustering of customers using transaction patterns. Example process 400 includes one or more operations, actions, or functions as illustrated by one or more of blocks 402, 404 and 406. Although illustrated as discrete blocks, various blocks may be divided into additional blocks, combined into fewer blocks, or eliminated, depending on the desired implementation. Process 400 may be implemented by one or more processors including, for example, one or more processors of back-end device 102 and processor 304 of computing device 300. Moreover, some or all of the operations of process 400 may be carried out by filtering and classification module 308 under the control of processor 304. For illustrative purposes, the operations described below are performed by one or more processors of computing device 300 as shown in FIG. 3.

At 402, processor 304 of computing device 300 may receive, e.g., from database 108, customer information that includes at least a plurality of customer identifications and a plurality of payment options associated with a plurality of customers.

At 404, processor 304 of computing device 300 may identify a subset of payment options, from among the payment options, and a subset of customer identifications, from among the customer identifications, such that each payment option of the subset of payment options is associated with more than one customer identification of the subset of customer identifications.

At 406, processor 304 of computing device 300 may classify each customer identification of the subset of customer identifications as either one of more than one of the customer identifications associated with a single one of the customers or one of more than one of the customer identifications associated with more than one of the customers who are related to each other.

To illustrate, consider an example where user 106 queries back-end device 102 to cluster e-commerce customers of the e-commerce website. In this example, processor 304 of computing device 300 can retrieve customer information form database 108, identify customer identifications and payment options, e.g., credit cards, where each of the identified payment option is associated with more than one customer identification. Processor 304 then filters the customer information and classifies those customers associated with the identified customer identifications into two categories: those customers each of whom is associated with more than one customer identification, and those customers each of whom is a member of a household that use the same payment option.

In one embodiment, for each of the customers, the customer information further includes a first name, a last name, a physical address, an email address, one or more order details, one or more additional payment options, a transaction history, one or more preferences, or a combination thereof.

In one embodiment, in identifying the subset of payment options and the subset of customer identifications, processor 304 of computing device 300 may filter for one or more of the payment options associated with more than one of the customer identifications. Additionally, in one embodiment, processor 304 of computing device 300 may further filter for one or more customer identifications each of which having a recent transaction history.

In one embodiment, in classifying each customer identification of the subset of customer identifications, processor 304 of computing device 300 may determine a similarity score for each of the more than one customer identifications associated with the respective payment option for each payment option of the subset of payment options.

In one embodiment, the similarity score for each of the more than one customer identifications may be indicative of similarities between a string of one or more pieces of personal information associated with a respective one of the more than one customer identifications and a respective string of one or more pieces of personal information associated with each of one or more other of the more than one customer identifications. In one embodiment, the one or more pieces of personal information may include a first name, a last name, a physical address, an email address, or a combination thereof.

In one embodiment, in classifying each customer identification of the subset of customer identifications, processor 304 of computing device 300 may classify a first customer identification of the subset of customer identifications as one of more than one of the customer identifications associated with a first customer among the customers responsive to the similarity score associated with the first customer identification being greater than a first predefined threshold. Furthermore, the similarity score for each of the more than one customer identifications may be indicative of similarities in a first set of personal information between a respective one of the more than one customer identifications and each of one or more other of the more than one customer identifications. The first set of personal information may include, for example, a combination of two or more of a first name, a last name, a physical address, and an email address.

Additionally, in classifying each customer identification of the subset of customer identifications, processor 304 of computing device 300 may further classify a second customer identification of the subset of customer identifications as one of more than one of the customer identifications associated with more than one of the customers who are related to each other responsive to the similarity score associated with the second customer identification being greater than a second predefined threshold. Moreover, the similarity score for each of the more than one customer identifications may be indicative of similarities in a second set of personal information between a respective one of the more than one customer identifications and each of one or more other of the more than one customer identifications. In particular, a quantity of pieces of personal information in the second set is lower than a quantity of pieces of personal information in the first set. The second set of personal information may include, for example, a last name and a physical address.

In one embodiment, at least one of the payment options includes a credit card, a check, bank account, another form of traceable tender, or a combination thereof.

In one embodiment, process 400 may further include displaying a result of the classifying, e.g., by processor 304 of computing device 300 causing front-end device 104 to display the result of classifying to user 106.

Figure 5:
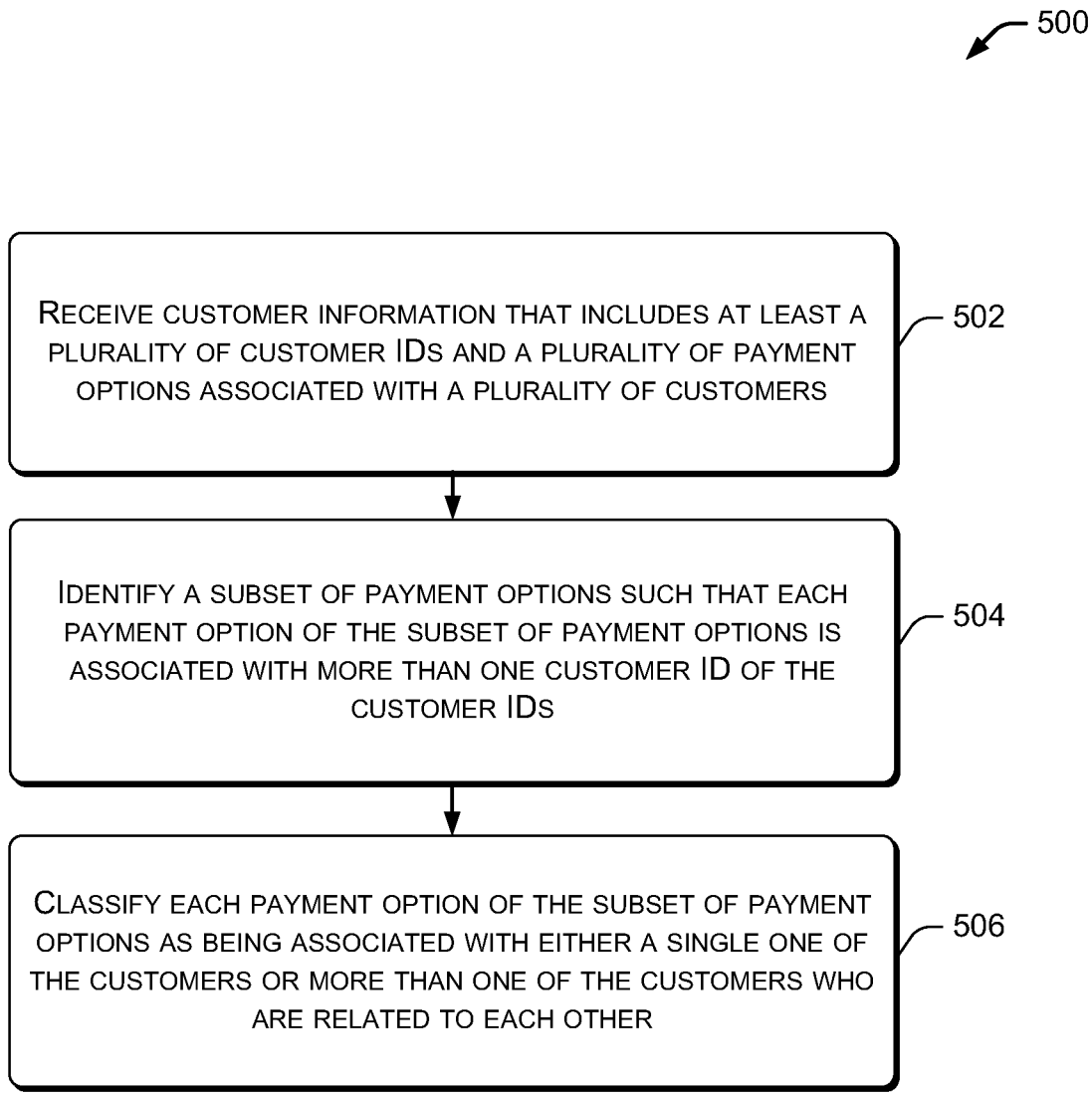
FIG. 5 is a flowchart diagram of another embodiment of a process of the present disclosure.

FIG. 5 illustrates an example process 500 for clustering of customers using transaction patterns. Example process 500 includes one or more operations, actions, or functions as illustrated by one or more of blocks 502, 504 and 506. Although illustrated as discrete blocks, various blocks may be divided into additional blocks, combined into fewer blocks, or eliminated, depending on the desired implementation. Process 500 may be implemented by one or more processors including, for example, one or more processors of back-end device 102 and processor 304 of computing device 300. Moreover, some or all of the operations of process 500 may be carried out by filtering and classification module 308 under the control of processor 304. For illustrative purposes, the operations described below are performed by processor 304 of computing device 300 as shown in FIG. 3.

At 502, processor 304 of computing device 300 may receive customer information that includes at least a plurality of customer identifications and a plurality of payment options associated with a plurality of customers.

At 504, processor 304 of computing device 300 may identify a subset of payment options, from among the payment options, such that each payment option of the subset of payment options is associated with more than one of the customer identifications.

At 506, processor 304 of computing device 300 may classify each payment option of the subset of payment options as being associated with either a single one of the customers or more than one of the customers who are related to each other.

As an example, processor 304 of computing device 300 can retrieve customer information form database 108, identify customer identifications and payment options, e.g., credit cards, where each of the identified payment option is associated with more than one customer identification. Processor 304 then filters the customer information and classifies those payment options into two categories: those payment options each of which is associated with a single customer, and those payment options each of which is more than one customer of a household that use the same payment option.

In one embodiment, in classifying each payment option of the subset of payment options as being associated with either a single one of the customers or more than one of the customers who are related to each other, processor 304 of computing device may classify each of the customer identifications as either one of more than one of the customer identifications associated with a single one of the customers or one of more than one of the customer identifications associated with more than one of the customers who are related to each other.

In one embodiment, in classifying each payment option of the subset of payment options as being associated with either a single one of the customers or more than one of the customers who are related to each other, processor 304 of computing device may determine a similarity score for each of the more than one customer identifications associated with the respective payment option for each payment option of the subset of payment options.

In one embodiment, the similarity score for each of the more than one customer identifications may be indicative of similarities between a string of one or more pieces of personal information associated with a respective one of the more than one customer identifications and a respective string of one or more pieces of personal information associated with each of one or more other of the more than one customer identifications.

In one embodiment, in determining a similarity score for each of the more than one customer identifications associated with the respective payment option, processor 304 of computing device 300 may determine a measure of edit distance between a string of one or more pieces of personal information associated with a respective one of the more than one customer identifications and a respective string of one or more pieces of personal information associated with each of one or more other of the more than one customer identifications.

In one embodiment, the measure of edit distance may relate to a number of insertions, deletions, substitutions, or a combination thereof, performed to transform a first string of one or more pieces of personal information associated with a first of the customer identifications to a second string of one or more pieces of personal information associated with a second of the customer identifications.

A number of embodiments include a system. The system can include one or more processors and one or more non-transitory memory storage devices storing computer instructions configured to run on the one or more processors and to perform multiple functions. The computer instructions can be configured to perform receiving one or more user identifications of one or more users and one or more payment options associated with multiple transactions. The computer instructions can also be configured to perform identifying the one or more user identifications associated with one or more user profiles. The computer instructions can additionally be configured to perform distilling a subset of payment options from among the one or more payment options, and a subset of user identifications from among the one or more user identifications, such that each payment option of the subset of payment options is associated with more than one user identification of the subset of user identifications. The computer instructions can be configured to perform analyzing the subset of payment options for patterns based on the subset of user identifications associated with a single payment option of the subset of payment options to cluster each user identification of the subset of user identifications into multiple classifications. A logistic regression algorithm can be used in determining a first classification comprising a single user of the one or more users mapped to more than one of the subset of user identifications. A logistic regression algorithm can also be used in determining a second classification comprising one or more first users of the one or more users mapped to the more than one user identification of the subset of user identifications, wherein the one or more first users are part of the same household. Responsive to receiving a query, the computer instructions can be configured to perform providing instructions to display a particular classification of the each user identification of the subset of user identifications at a computing device.

Various embodiments include a method. The method can include being implemented via execution of computing instructions configured to run at one or more processors and stored at one or more non-transitory computer-readable media. The method can include receiving one or more user identifications of one or more users and one or more payment options associated with multiple transactions. The method can also include identifying the one or more user identifications associated with one or more user profiles. The method can additionally include distilling a subset of payment options from among the one or more payment options, and a subset of user identifications from among the one or more user identifications, such that each payment option of the subset of payment options is associated with more than one user identification of the subset of user identifications. The method can further include analyzing the subset of payment options for patterns based on the subset of user identifications associated with a single payment option of the subset of payment options to cluster each user identification of the subset of user identifications into multiple classifications. A logistic regression algorithm can be used in determining a first classification comprising a single user of the one or more users mapped to more than one of the subset of user identifications. A logistic regression algorithm can also be used in determining a second classification comprising one or more first users of the one or more users mapped to the more than one user identification of the subset of user identifications, wherein the one or more first users are part of the same household. Responsive to receiving a query, the method can include providing instructions to display a particular classification of the each user identification of the subset of user identifications at a computing device.

Many embodiments include a system. The system can include one or more processors and one or more non-transitory computer-readable media storing computing instructions configured to run on the one or more processors and perform certain acts. The acts can include receiving, at a back-end device of the system, a query from a user interface of a front-end device requesting two or more user identifications mapped to a same payment option of multiple payment options. In association with multiple transactions, the acts can also include receiving multiple user identifications of multiple users and their respective payment options of the multiple payment options. The acts can further include distilling a subset of payment options from among the multiple payment options. The acts can include distilling a subset of user identifications from among the multiple user identifications. Distilling a subset of user identifications can also include each payment option of the subset of payment options being associated with more than one user identification of the subset of user identifications. The acts can additionally include analyzing the subset of payment options to create an analysis of patterns based on the subset of user identifications associated with a single payment option of the subset of payment options. The acts can also include identifying, using the analysis, a first classification comprising a single user of the subset of user identifications. The first classification can also include the subset of user identifications being mapped to more than one user identification of the subset of user identifications. The acts can include identifying, using the analysis, a second classification comprising two or more first users of the subset of user identifications that are part of a same household. Responsive to receiving the query, the acts can further include sending instructions to display, on the user interface of the front-end device, at least one of the first classification or the second classification for each user identification of the subset of user identifications.

Several embodiments include a method. The method can include being implemented via execution of computing instructions configured to run at one or more processors and stored at one or more non-transitory computer-readable media. The method can further include, receiving, at a back-end device of the system, a query from a user interface of a front-end device requesting two or more user identifications mapped to a same payment option of multiple payment options. In association with multiple transactions, the method can also include receiving multiple user identifications of multiple users and their respective payment options of the multiple payment options. The method can further include distilling a subset of payment options from among the multiple payment options. The method can also include distilling a subset of user identifications from among the multiple user identifications, such that each payment option of the subset of payment options is associated with more than one user identification of the subset of user identifications. The method can additionally include analyzing the subset of payment options to create an analysis of patterns based on the subset of user identifications associated with a single payment option of the subset of payment options. The method can include identifying, using the analysis, a first classification comprising a single user of the subset of user identifications that is mapped to more than one user identification of the subset of user identifications. Further, the method can also include identifying, using the analysis, a second classification comprising two or more first users of the subset of user identifications that are part of a same household. Responsive to receiving the query, the method can also include sending instructions to display, on the user interface of the front-end device, at least one of the first classification or the second classification for each user identification of the subset of user identifications.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. For example, although the framework, algorithms, techniques, systems and methods of the present disclosure are described in the context of clustering customers using transaction patterns, applications of the disclosed framework, algorithms, techniques, systems and methods are also suitable for personalization, targeting, business analysis, etc. Moreover, the disclosed framework, algorithms, techniques, systems and methods are applicable wherever a traceable tender is available, and hence the disclosed framework, algorithms, techniques, systems and methods are viable beyond e-commerce setting as described herein (e.g., brick-and-mortar setting). For instance, a brick-and-mortar business may utilize the disclosed framework, algorithms, techniques, systems and methods to cluster and classify its in-store customers using patterns of their in-store transactions. Furthermore, the disclosed framework, algorithms, techniques, systems and methods may be used to cluster or classify customers across businesses, e.g., grouping Walmart.com customers and Sam's Club customers using traceable tender information. This helps identify intersection of the customer bases of two or more businesses, whether e-commerce or brick-and-mortar, and leads to cross-channel understanding of customers and better targeting and personalization. It is to be understood that other embodiments may be utilized, without departing from the scope of the present disclosure.

What is claimed is:

1. A system comprising:
one or more processors; and
one or more non-transitory computer-readable media storing computer instructions configured to run on the one or more processors and to perform:
receiving, at a back-end device of the system, a query from a user interface of a front-end device requesting two or more user identifications mapped to a same payment option of multiple payment options;
in association with multiple transactions, receiving multiple user identifications of multiple users and their respective payment options of the multiple payment options;
distilling a subset of payment options from among the multiple payment options;
distilling a subset of user identifications from among the multiple user identifications, such that each respective payment option of the subset of payment options is associated with more than one user identification of the subset of user identifications;
analyzing the subset of payment options to create an analysis of patterns based on the subset of user identifications associated with a single payment option of the subset of payment options;
identifying, using the analysis, a first classification comprising a single user of the subset of user identifications that is mapped to more than one user identification of the subset of user identifications;
identifying, using the analysis, a second classification comprising two or more first users of the subset of user identifications that are part of a same household; and
responsive to receiving the query, sending instructions to display, on the user interface of the front-end device, at least one of the first classification or the second classification for each respective user identification of the subset of user identifications.

2. The system of claim 1, wherein the computer instructions are further configured to perform:
identifying the multiple user identifications associated with multiple user profiles.

3. The system of claim 1, wherein identifying, using the analysis, the first classification further comprises:
determining, using a logistic regression algorithm, the first classification.

4. The system of claim 3, wherein identifying, using the analysis, the second classification further comprises:
determining, using the logistic regression algorithm, the second classification.

5. The system of claim 3, wherein the determining, using the logistic regression algorithm, further comprises filtering the subset of user identifications into the first classification or the second classification using probabilistic matching by the logistic regression algorithm expressed as:

$$P(I_t^{ij} = 1 \mid c_t^i, c_t^j) = \frac{1}{1 + e^{-wx}}$$

where:
- $c_t^i$ represents a $i^{th}$ user identification in a record $D_t$,
- $c_t^j$ represents a $j^{th}$ user identification in the record $D_t$,
- $P(i_t^{ij} c_t^i, c_t^j)$ is a posterior probability to be calculated,
- $I_t^{ij}$ represents a binary random variable that denotes whether two users $c_t^i$ and $c_t^j$ in the record $D_t$ belong to the first classification ($I_t^{ij}=1$) or otherwise,
- x represents a vector representing features derived from user identifications in $c_t^i$ and $c_t^j$, and
- w represents weights of a logistic regression.

6. The system of claim 1, wherein the computer instructions are further configured to perform:
filtering the each respective user identification of the subset of user identifications comprising:
determining whether a record $D_t$ is classified in the first classification based on analyzing the each respective payment option of the subset of payment options by determining a respective first similarity score for each of the multiple user identifications of the subset of user identifications mapped to a same payment option, using:
let $D_t=\{D_i\}$, i=1, 2, . . . N, where in $D_i$ denotes a collection of information pertaining to the multiple users who used a particular payment option $t_i$, and N denotes a number of records in a data set; and
each respective record $D_k$ may be expressed as $\{t_k, c^1_k c^2_k, \ldots\}$, where $D_k$ includes a $t_k$ unique user identification generated from the particular payment option $t_i$ comprising a credit card, and $c^j_k$ represents a jth user identification that used the $t_k$ unique user identification; and
determining whether the record $D_t$ is classified in the second classification by using the one or more processors to determine similarities in user information and filtering for similarities using a second similarity score, wherein the determining whether the record $D_t$ is classified in the second classification further comprises:
searching the user information comprising at least first names, last names, and physical addresses;
applying an edit distance on the first names and the last names between all pairs of the user information in the record $D_t$ that shared the single payment option;
filtering the user information by the single payment option attributable to the multiple user identifications and by transaction history; and
clustering the user information into the second classification when the edit distance for the user information falls below a preset threshold.

7. The system of claim 6, wherein the respective first similarity score for the each of the multiple user identifications of the subset of user identifications is indicative of similarities between a string of one or more pieces of the user information associated with a respective one of the multiple user identifications and a respective string of the one or more pieces of the user information associated with each of one or more other ones of the multiple user identifications.

8. The system of claim 7, wherein the one or more pieces of the user information comprises an email address.

9. The system of claim 1, wherein the computer instructions are further configured to perform:
filtering the each respective user identification of the subset of user identifications comprising:
filtering a first user identification of the subset of user identifications as one of the multiple user identifications associated with a first user among the multiple users responsive to a respective similarity score associated with the first user identification being greater than a first predefined threshold,
wherein:
the respective similarity score for each of the multiple user identifications is indicative of similarities in a first set of user information between a respective one of the multiple user identifications and each respective one or more other ones of the multiple user identifications.

10. The system of claim 9, wherein the first set of user information comprises a combination of two or more of a first name, a last name, a physical address, or an email address.

11. A method being implemented via execution of computing instructions configured to run at one or more processors and stored at one or more non-transitory computer-readable media, the method comprising:
receiving, at a back-end device of a system, a query from a user interface of a front-end device requesting two or more user identifications mapped to a same payment option of multiple payment options;
in association with multiple transactions, receiving multiple user identifications of multiple users and their respective payment options of the multiple payment options;
distilling a subset of payment options from among the multiple payment options;
distilling a subset of user identifications from among the multiple user identifications, such that each respective payment option of the subset of payment options is associated with more than one user identification of the subset of user identifications;
analyzing the subset of payment options to create an analysis of patterns based on the subset of user identifications associated with a single payment option of the subset of payment options;
identifying, using the analysis, a first classification comprising a single user of the subset of user identifications that is mapped to more than one user identification of the subset of user identifications;
identifying, using the analysis, a second classification comprising two or more first users of the subset of user identifications that are part of a same household; and
responsive to receiving the query, sending instructions to display, on the user interface of the front-end device, at least one of the first classification or the second classification for each respective user identification of the subset of user identifications.

12. The method of claim 11, further comprising:
identifying the multiple user identifications associated with multiple user profiles.

13. The method of claim 11, wherein identifying, using the analysis, the first classification further comprises:

determining, using a logistic regression algorithm, the first classification.

14. The method of claim 13, wherein identifying, using the analysis, the second classification further comprises:
determining, using the logistic regression algorithm, the second classification.

15. The method of claim 13, wherein the determining, using the logistic regression algorithm, further comprises filtering the subset of user identifications into the first classification or the second classification using probabilistic matching by the logistic regression algorithm expressed as:

$$P(I_t^{ij} = 1 \mid c_t^i, c_t^j) = \frac{1}{1 + e^{-wx}}$$

where:
$c_t^i$ represents a $i^{th}$ user identification in a record $D_t$,
$c_t^j$ represents a $j^{th}$ user identification in the record $D_t$,
$P(I_t^{ij} c_t^i, c_t^j)$ is a posterior probability to be calculated,
$I_t^{ij}$ represents a binary random variable that denotes whether two users $c_t^i$ and $c_t^j$ in the record $D_t$ belong to the first classification ($I_t^{ij}=1$) or otherwise,
x represents a vector representing features derived from user identifications in $c_t^i$ and $c_t^j$, and
w represents weights of a logistic regression.

16. The method of claim 11, further comprising:
filtering the each respective user identification of the subset of user identifications comprising:
determining whether a record $D_t$ is classified in the first classification based on analyzing the each respective payment option of the subset of payment options by determining a respective first similarity score for each of the multiple user identifications of the subset of user identifications mapped to a same payment option, using:
let $D_t = \{D_i\}$, i=1, 2, . . . N, where in $D_i$ denotes a collection of information pertaining to the multiple users who used a particular payment option $t_i$, and N denotes a number of records in a data set; and
each respective record $D_k$ may be expressed as $\{t_k, c^1_k, c^2_k, \ldots\}$ where $D_k$ includes a $t_k$ unique user identification generated from the particular payment option $t_i$ comprising a credit card, and $c^j_k$ represents a jth user identification that used the $t_k$ unique user identification; and
determining whether the record $D_t$ is classified in the second classification by using the one or more processors to determine similarities in user information and filtering for similarities using a second similarity score, wherein the determining whether the record $D_t$ is classified in the second classification further comprises:
searching the user information comprising at least first names, last names, and physical addresses;
applying an edit distance on the first names and the last names between all pairs of the user information in the record $D_t$ that shared the single payment option;
filtering the user information by the single payment option attributable to the multiple user identifications and by transaction history; and
clustering the user information into the second classification when the edit distance for the user information falls below a preset threshold.

17. The method of claim 16, wherein the respective first similarity score for the each of the multiple user identifications of the subset of user identifications is indicative of similarities between a string of one or more pieces of the user information associated with a respective one of the more than one user identification and a respective string of the one or more pieces of the user information associated with each of one or more other ones of the more than one user identification.

18. The method of claim 17, wherein the one or more pieces of the user information comprises an email address.

19. The method of claim 11, further comprising:
filtering the each respective user identification of the subset of user identifications comprising:
filtering a first user identification of the subset of user identifications as one of the multiple user identifications associated with a first user among the multiple users responsive to a respective similarity score associated with the first user identification being greater than a first predefined threshold,
wherein:
the respective similarity score for each of the multiple user identifications is indicative of similarities in a first set of user information between a respective one of the multiple user identifications and each of one or more other ones of the multiple user identifications.

20. The method of claim 19, wherein the first set of user information includes a combination of two or more of a first name, a last name, a physical address, and an email address.

* * * * *